United States Patent [19]

Shibazaki et al.

[11] Patent Number: 4,928,826
[45] Date of Patent: May 29, 1990

[54] PATRONE FOR PHOTOGRAPHIC FILM

[75] Inventors: Osamu Shibazaki, Hino; Yorikatu Miyazawa; Toshio Kato, both of Hachioji, all of Japan

[73] Assignee: Konica Corporation, Tokyo, Japan

[21] Appl. No.: 256,794

[22] Filed: Oct. 12, 1988

[30] Foreign Application Priority Data

Mar. 18, 1988 [JP] Japan .............................. 63-36801[U]
Mar. 18, 1988 [JP] Japan .............................. 63-36802[U]

[51] Int. Cl.⁵ ............................................. G03B 17/26
[52] U.S. Cl. ................................... 206/409; 206/407; 242/71.1
[58] Field of Search ....................... 206/316, 407, 409; 242/71.1, 71.2, 71.3, 71.4, 71.5

[56] References Cited

U.S. PATENT DOCUMENTS

2,423,663  7/1947  Roehrl ............................... 242/71.1
2,729,401  1/1956  Italiano .............................. 242/71.1
3,276,340  10/1966  Nerwin .............................. 242/71.1

Primary Examiner—Paul T. Sewell
Assistant Examiner—Jacob K. Ackon, Jr.
Attorney, Agent, or Firm—Finnegan, Henderson, Farabow, Garrett and Dunner

[57] ABSTRACT

The present invention relates to a cartridge for packaging a roll film. The cartridge has a film outlet that is composed of upper and lower lips, each lip has a light-shielding ribbon attached to the inside thereof. Both extended side edge portions of the ribbon attached to the lower lip are slightly bent downwardly. Both extended side portions of the ribbon attached to the upper lip are also bent downwardly at a slightly larger angle than that of the lower lip. Consequently both side edge portions of both upper and lower lips overlap in a more complete manner or are more positively joined together.

11 Claims, 7 Drawing Sheets

PATRONE FOR PHOTOGRAPHIC FILM

The present invention relates to a Patrone which is a cartridge for packaging a roll film, in particular, to a Patrone that stores a photographic film comprising a 16 mm, or 35 mm rolled film or the like.

Figure 10:
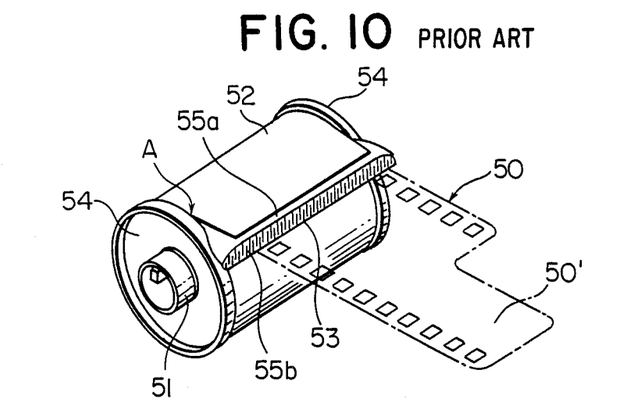
FIG. 10 is a perspective view of patrone of the prior art.
Figure 11:
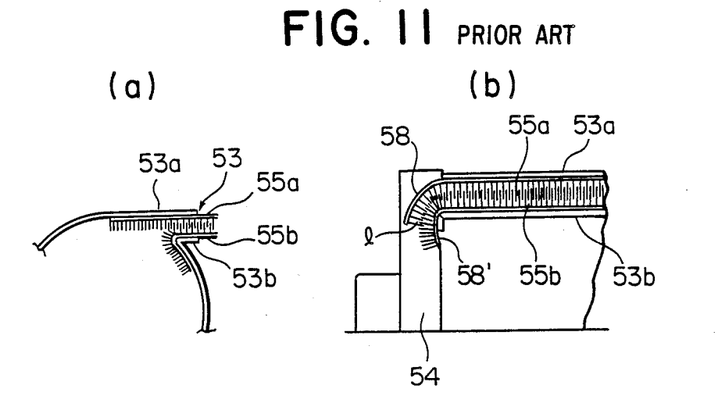
FIGS. 11, 12 and 13 are sectional views of the patrone of the prior art.

Generally speaking, a Patrone for storing a photographic film comprises, as shown in FIG. 10–11, a shell 52 provided with a bill-shaped film outlet 53. The film outlet 53 comprises an upper lip 53a extending along a tangent line, and a lower lip 53b facing the upper lip 53a from below as formed into a hook shaped cross-section, wherein the respective faces of the lips facing each other are provided correspondingly with light-shielding ribbons 55a and 55b. According to this arrangement, both side edge portions 58 and 58' of the upper and lower light-shielding ribbons 55a and 55b extend outside the widths of the upper and lower lips 53a and 53b. As shown in FIG. 11(b), these ribbons are bent perpendicularly downward into a fitting cap 54.

However, with such a prior art Patrone above, both side edge portions 58' of the light-shielding ribbon 55b attached to the lower rip 53b are bent perpendicularly, and both side edge portions 58 of upper light-shielding ribbon 55a overlap those of the lower light-shielding ribbon 55b. Consequently, both ends of the film outlet respectively form an open mouth, and, therefore, pile-to-pile overlap l is not large enough, and light-shielding is not positively ensured. Additionally, both side edge portions of the lower light-shielding ribbon 55b of the prior art Patrone are bent perpendicularly downward to form the open mouth. Such that in some cases, a Patrone is not readily set at a correct position in a camera. Such open mouth of the Patrone has causes the Patrone to be unstable when a film in the Patrone is drawn out in a development laboratory or the like, and is responsible for various problems such as a longer operation time for drawing out the film.

Figure 12:
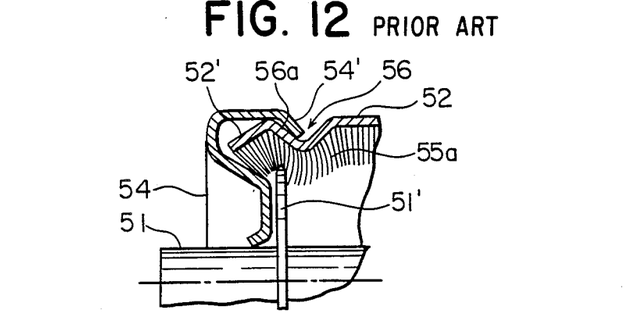

The conventional Patrone shell 52 is provided, at both sides, respectively, with a V-contoured groove 56 as shown in FIG. 12, wherein a circumferential rim edge 54' of the cap 54 is choked inward so that the rim edge 54' can be fitted to an external ramp 56a of the V-contoured groove 56. Accordingly, the cap 54 is engaged with the Patrone shell 52 when strongly pressed so that an edge 54' of the cap 54 overrides the ramp on the outer edge 52' of the Patrone shell 52.

Figure 13:
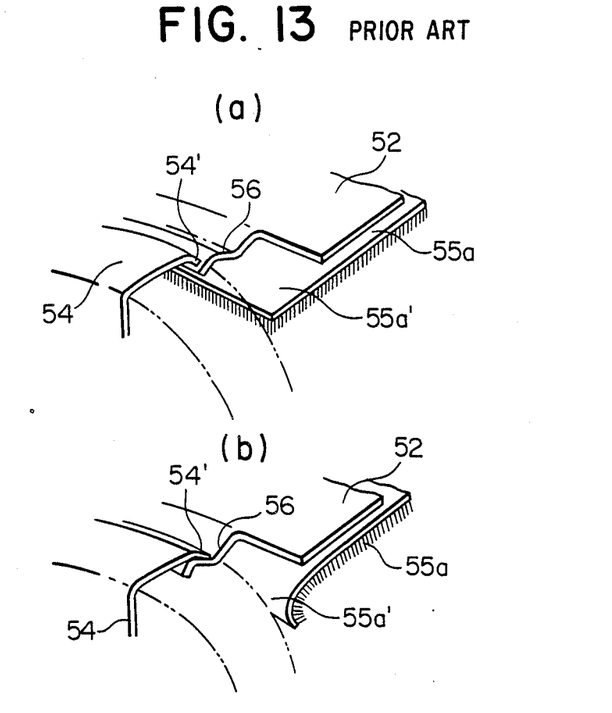

However, when the edge 54' of the cap 54 is fitted to and strongly pressed against the ramp of the outer edge of the Patrone shell 52 as illustrated in FIG. 13(a), the impact possibly causes both side edge portions 55a', of the light-shielding ribbon 55a attached to the upper and lower lips on the film outlet 53, to depart from the lips and to become warped as illustrated in FIG. 13(b). As a result, light can possibly enter the Patrone through the area (indicated by symbol A in FIG. 10).

The Patrone shell 52 is subjected to a tightening force once the cap 54 is fitted into position, thereby groups of pile on the light-shielding ribbons 55a and 55b, originally attached in conformity with the inside contour of the V groove 56 form lumps that come into contact with a flange 51' on a spool 51 as shown in FIG. 12, thereby the lumps exerts friction on the spool, requiring a larger load for drawing out the film.

Figure 14:
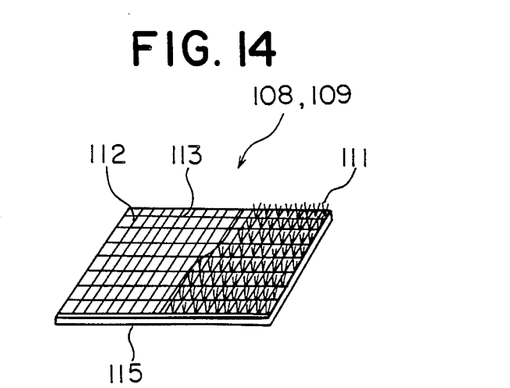
FIG. 14 is a perspective view of light shielding-ribbon.
Figure 15:
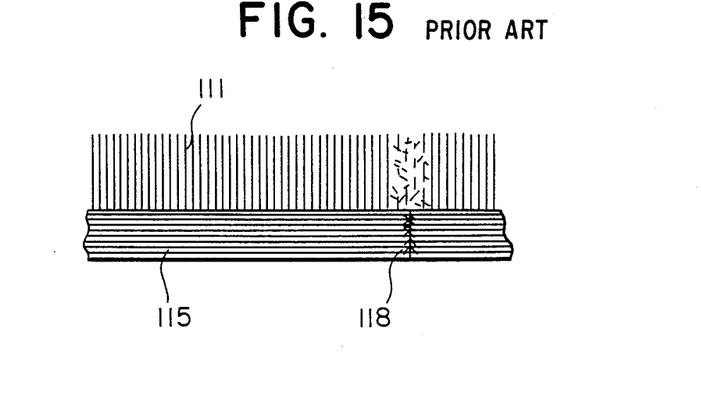
FIGS. 15 and 16 represent a manufacturing process of the prior art.
Figure 16:
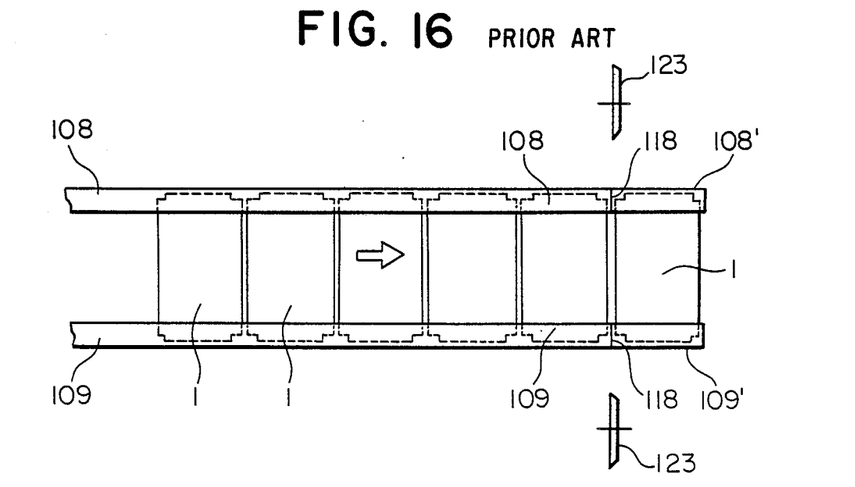

As shown in FIG. 14, a light-shielding ribbon comprises a ground fabric 115 that is composed of warps 112 and wefts 113 wherein to respective stitches are connected a group of pile 111, thereby groups of pile of a uniform height are densely disposed at uniform intervals. Once such a light-shielding ribbon is cut into a predetermined shape as in FIG. 16, the stitches on a cut line are severed as in FIG. 15, thereby pile and threads come loose and can be scattered on a light-shielding ribbon. Where a photographic film is loaded into a Patrone or magazine having an irregular light-shielding ribbon, when the ribbon is drawn out for exposure or wound up, because it is in contact with the light-shielding ribbon, the chips of pile or floss of thread may adhere to the film surface in during exposing, and can jeopardize image quality.

One means for removing chips of pile is a vacuum suction or the like. However, this countermeasure is still insufficient.

SUMMARY OF THE INVENTION

The present invention is intended for solving these problems, and one object of which is to provide a Patrone for housing a photographic film, wherein the Patrone has good light-shielding capability, and allows the proper positioning in a camera and allows correct positioning, to allow the film to be smoothly drawn out of the Patrone.

Another object of the invention is to provide a Patrone for housing a photographic film, wherein the Patrone is characterized by smaller load for drawing out the film and by improved light-shielding capability.

To achieve the above-mentioned objects, the Patrone for photographic film, according to the invention, comprises a film outlet that is composed of upper and lower lips, each having a light-shielding ribbon attached to the inside thereof, wherein both extended side edge portions of the ribbon attached to the lower lip are slightly bent downward, and both extended side edge portions of the ribbon attached to the upper lip are bent downward that are slightly larger than those of the lower lip, whereby both side edge portions of both upper and lower lips are more positively joined together thereby pile-to-pile overlap is positively increased.

Furthermore, the Patrone according to the invention comprises not only a cylindrical shell having a film outlet that is composed of upper and lower lips, each having a light-shielding ribbon attached to the inside thereof; but also caps that independently have on a circumferential face a U-contoured groove that fits to each end of the cylindrical shell, wherein each cap centrally has a through hole through which one end of a spool shaft penetrates; and wherein the cylindrical shell holds parts of both side edge portions of the light-shielding ribbons, thereby the light-shielding ribbons are prevented from being stripped while the cap is fitted into position, and, at the same time, pile of the light-shielding ribbons attached to the Patrone shell that has been tightened by the cap having been fitted into position does not come into contact with a spool flange.

According to the invention, additionally, the light-shielding ribbons as light-shielding members are attached onto a film outlet, and subjected to a heat treatment, and then the ribbons are cut into a predetermined shape.

BRIEF DESCRIPTION OF THE DRAWING

FIGS. 4 (a) and 4 (b) are schematic views indicating a manufacturing process of forming the patrone of the present invention.

PREFERRED EMBODIMENTS

Figure 1:
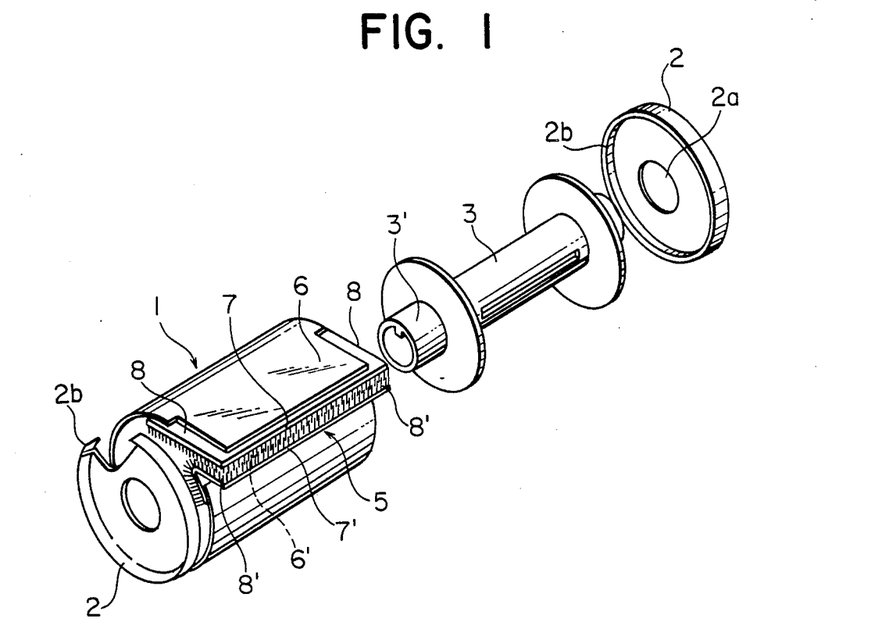
FIG. 1 is a perspective view of patrone of the present invention.
Figure 9:
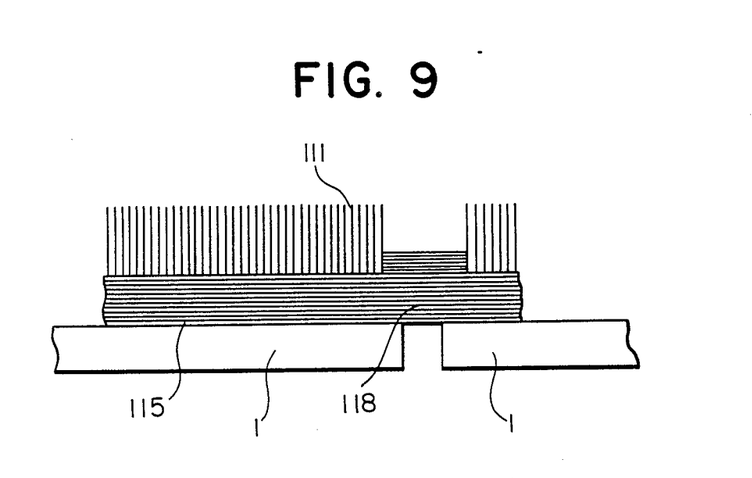
FIG. 9 is a section view of the manufacturing process for cutting the ribbon attached to the shell plate.

The present invention is hereunder described in detail referring to preferred embodiments illustrated in FIGS. 1 and 9.

In FIG. 1, numeral 1 represents a shell; 2 represents caps respectively fit to both ends of the shell 1, wherein each cap centrally has a hole 3 through which a shaft 2a of a spool 3 penetrates, and each cap 2 has on a circumferential face a U-contoured groove 2b that fits to each of both ends of the shell 1 to secure caps 2 thereon.

Figure 2:
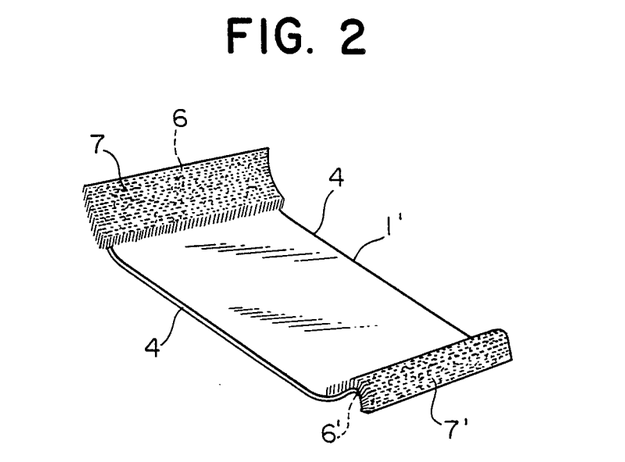
FIG. 2 is a perspective view of an expanded shell plate of the patrone of the present invention.

The shell 1 is formed by rolling up a spread plate 1' in FIG. 2. The spread plate 1' has, along a lengthwise direction side portions 4, each rolled to fit into U-contoured groove 2b of cap 2; and has along, the span direction upper and lower lips 6 and 6' that form a film outlet 5. Upper lip 6 is a flat extension, while the lower lip 6' is bent into a hook-shaped cross-section and faces the upper lip 6, wherein both lips form a pair of bills as shown in this figure. The mutually opposing faces of the upper and lower lips 6 and 6' have light-shielding ribbons 7 and 7' attached respectively.

Figure 3:
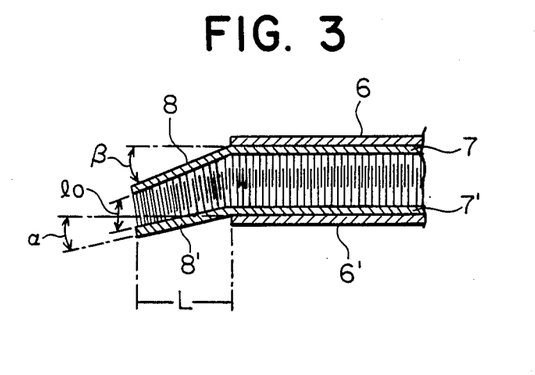
FIGS. 3, 5 and 6 are enlarged views respectively representing side portions of light-shielding ribbon.

These light-shielding ribbons 7 and 7' are wider than that of lip portions 6 and 6'. The extended side edge portion 8' corresponding to corner portions of the light-shielding ribbon 7' attached to the lower lip 6' is bent slightly downward (angle $\alpha$) as shown in FIG. 3, while the extended side edge portion 8 of the light-shielding ribbon 7 attached to the upper lip 6 is bent more positively downward (angle $\beta$). The angle $\alpha$ preferably satisfies $0 < \alpha < 10°$, while the angle $\beta$ preferably satisfies $15° < \beta < 25°$. More specifically, $\alpha = 4$ to $8°$; $\beta = 13$ to $22°$.

In other words, unlike a conventional arrangement where both side edge portions of both light-shielding ribbons 7 and 7' are bent at right angle, the arrangement above of the invention allows the extension length L to be fully used to seal, thereby pile-to-pile overlap $l_o$ is greater due to increased pressing force exerted upon the pile, and accordingly, light-shielding capability of the pile is greater. A quality proving test for the Patrone has revealed the correlation between the pile-to-pile overlap $l_o$ and the light-shielding capability requires $l_o \geq 0.4$ mm. In this quality proving test, fogging occurred on a film loaded in a Patrone is examined after irradiating the Patrone with an 80,000 lux xenon lamp for 1 minute.

Figure 4:
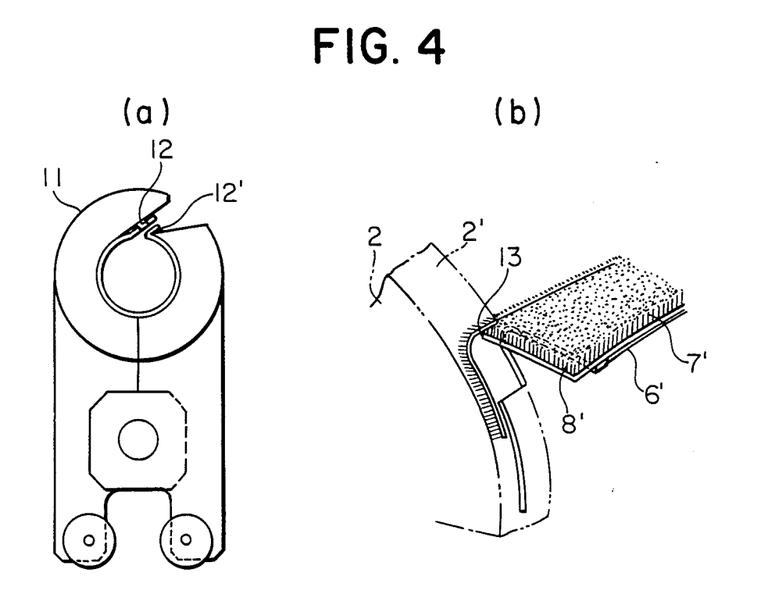

The bend of angle $\alpha$ of the extended side edge portion 8' of the light-shielding ribbon 7', as well as the bend of angle $\beta$ of the extended side edge portion 8 of the light-shielding ribbon 7 are formed as follows: as shown in FIG. 4(a), an upper lip retaining portion and lower lip retaining portion both on a Patrone holder (clamper) 11 are provided with protrusions 12 and 12' that correspondingly press the extended side edge portions 8 and 8' of the light-shielding ribbons 7 and 7' so as to come in pressure contact with each others in above angles. When the caps 2 are fitted to both ends of the Patrone shell 1 held in the Patrone holder 11, the extended side edge portion 8' of the light-shielding ribbon 7' for the lower lip is cut 13 by an edge (two-dot chain line) of a skirt portion of the cap as shown in FIG. 4(b), or, otherwise, both extended side edge portions 8 and 8' are fused together by heat.

Next, another preferred embodiment according to the invention is hereunder described. In FIG. 1, numeral 2 represents a cap fit to one of both ends of a Patrone shell 1, wherein each cap 2 centrally has a hole 2a through which a shaft 3' of a spool 3 penetrates, and is provided, on its circumferential face, with a U-contoured groove 2b that engages with each of both ends of the Patrone shell 1.

Figure 5:
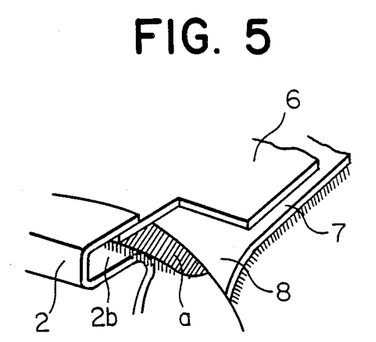

A film outlet 5 comprises a flat upper lip 6 extending horizontally, and a lower lip 6' facing the upper lip 6 from below as formed into a hook shaped cross-section, thereby both jointly form a bill, wherein the respective faces of the lips facing each other are provided correspondingly with light-shielding ribbons 7 and 7'. According to this arrangement, both side edge portions 8 and 8' of the upper and lower light-shielding ribbons 7 and 7' extend outside the widths of the upper and lower lips, thereby, when the cap 2 is fitted into position, as shown in FIG. 5, a certain area a (indicate by wave lines) of each of both side edge portions engages with the U-contoured groove 2b on the cap 2, thereby pile on either light-shielding ribbon 7 or 7' is well clear of a spool film 3" (FIG. 6).

To allow the light-shielding ribbons 7 and 7' to be positively held in the U-contoured grooves 2b on the caps 2, the important considerations include the width and height of the U-contoured groove 2b of cap 2; compressibility of pile on the light-shielding ribbons 7 and 7'; and peel strength of the light-shielding ribbons 7 and 7' attached to the Patrone shell 1.

The cap 2 has a U-contoured groove 2b whose width U being preferably 1.0 to 1.4 mm, and whose height H preferably 2.2 to 2.7 mm. At the same time, the height l of the pile on the light-shielding ribbons 7 and 7' is preferably 1.2 to 1.7 mm. According to this preferred embodiment, the light-shielding ribbons 7 and 7' are made of Nylon and have compressibility plotted in FIG. 7. In other words, their thickness 1.6 mm under a pressing force "0" becomes approximately 0.6 mm with a gradual increase in the pressing force and remains stable (thickness change levels off once the pressing force exceeds 10 kg). Therefore, even if the thickness of the shell 1 is 0.3 mm, the shell fits to the U-contoured groove 2b as far as the groove has a width U not less than 1.0 mm. The reason for the upper limit 1.4 mm of the width U of the U-contoured groove 2b is as follows: if the width U of the U-contoured groove 2b exceeds 1.4 mm, and if a fitting technique is used where the cap 2 is fitted to the Patrone shell 1 by, as shown in FIG. 6, pressing outward (cauking) P an internal rim portion 2b' of the U-contoured groove 2b using friction exerted by a processing tool (unshown), thereby the shell 1 is sandwiched between the internal rim 2b' and an external rim 2b″, internal-rim upsetting process incurs difficulty, and requires a high power processing tool, and results in a larger manufacturing cost.

Figure 6:
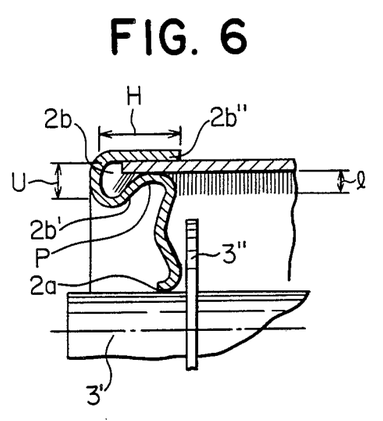
Figure 7:
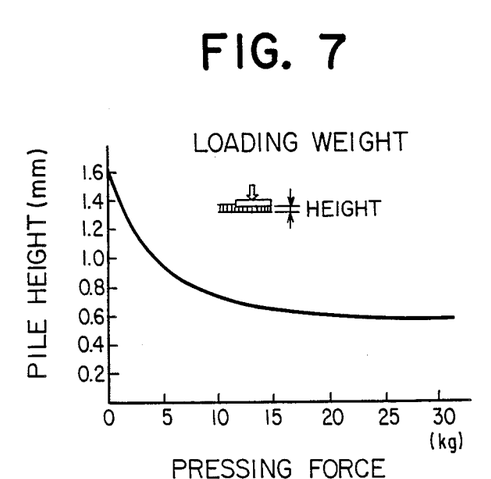
FIG. 7 is a diagram representing the relationship between pile height and pressing force of the ribbon.

According to the fitting technique (cauking technique) shown in FIG. 6 where the cap is fitted to the Patrone shell as the internal and external rims sandwich the shell, the cap can remain in position against up to 15 to 30 kg of departing force. In contrast, according to a so-called engagement technique where the outer edge engages with a V-contoured groove on the Patrone shell, only 5 to 12 kg of departing force can depart the cap out of position and may jeopardize light-shielding capability. On the other hand, the above-mentioned fitting technique is free from such a disadvantage and contributes to improvement of light-shielding capability, and expedites handling of Patrones in transportation, storage and the like.

The preferred peel strength of the light-shielding ribbons 7 and 7′ is within a range of 800 to 2000 kg: the strength in excess of 800 kg means that the light-shielding ribbons 7 and 7′ stably remain in position while the caps are fitted to the Patrone shell and that a peel strength in excess of 2000 kg is not necessary. In short, the above range is a range of peel strength for maintaining light-shielding capability.

The reason why the selected height H of the U-contoured groove 2b on the cap 2 is within a range of 2.2 to 2.7 mm is that a height less than 2.2 results in difficult for maintaining light-shielding capability, while a height in excess of 2.7 mm causes the groove to interfere with the film outlet.

EXPERIMENT 1

Under the following conditions, caps were fitted to a Patrone shell, and then joint to the latter by the above-mentioned fitting technique.
(1) Cap: width of U groove, 1.2 mm; height 2.5 mm
(2) Light-shielding ribbon: pile height, 1.6 mm, peel strength, 1100 g
(3) Patrone shell: plate thickness, 0.3 mm
(4) Film: 24 flames, color film, ASA 400

In the result of the fitting wark, both sides of ribbon were inserted into the U-contoured grove in good order without being peeled off from the shell.

EXPERIMENT 2

50 pieces of the Patrone for storing a photographic film according to the invention, prepared in the above Experiment 1, as well 50 pieces of a conventional Patrone for storing a photographic film were prepared and were respectively irradiated with a 800000 lux xenon lamp for 1 minute, and then, fogging of each stored film was evaluated. The films stored in the Patrone of the invention were totally free from fogging, while 5 films stored in the conventional Patrone were found to have fogging. The Patrones incurred fogging were disassembled, and were found to have developed such a problem, without exception, by a light-shielding ribbon fitted in out of order.

Figure 8:
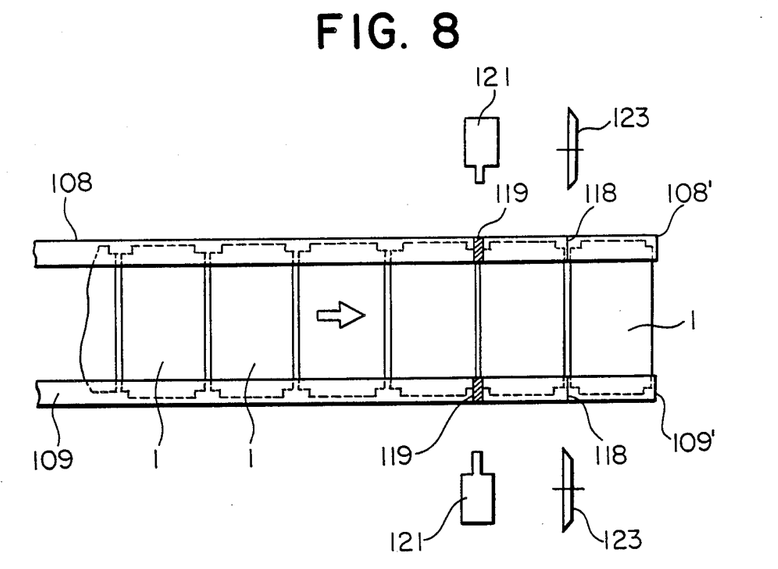
FIG. 8 is a schematic view indicating a manufacturing process of attaching the ribbon onto a shell plate of the patrone of the present invention.

Still preferred embodiment according to the invention is illustrated in FIGS. 8 and 9. The invention, however, is not limited only to hitherto exemplified embodiments. Members having like functions similar to those of a prior art are indicated with like reference numerals.

In FIG. 8, spread plates 1′ for Patrone shells 1 are placed on conveyor nests that are arranged at equal intervals, and are transported to the arrow direction at a constant speed, and, in the course of transportation, a joining material is applied onto both side edge portions of each spread plate 1′. At the same time, velvet strips 108 and 109 are transported to a direction and at a speed identical to those of the conveyor nests and are placed onto specific positions on the spread plates 1′ and pressed onto the spread plates 1′, thereby foundation fabric face of the light-shielding ribbon material is bonded to a corresponding inside face of a spread plate 1′. Next, in a step after the bonding step, prior to the severing process, each pile face, of velvet strips, in an area 119 between adjacent spread plates 1 on nests mentioned above is momentarily heated and pressed by a heater 121 in FIG. 8, in conjunction with the travel of the conveyor nests, wherein the heater 121 comes into contact with the pile face.

According to this preferred embodiment, the temperature of the heater is 250° C., and a pressing duration is 0.1 second, and a width of contact is 1 mm. The pile of a strip of fabric for a light-shielding ribbon is made of diacetate; while the foundation fabric is made of rayon.

Once such a heater is pressed onto a light-shielding ribbon, the pile face on the light-shielding ribbon fabric pressed by the heater lies flat, thereby as shown in FIG. 9, a portion of pile 111 as well as foundation fabric 115 composed on warps and wefts 112 and 113 are fused together. Accordingly, when the fused area is cut along the border area by a cutter 123 in a next processing step, the so-formed cut area 118 is free from loosening or irregularity of pile or threads, thereby a light-shielding ribbon is always maintained in tidy condition. Incidentally, this preferred embodiment was described based on a rapid, constant speed continuous bonding system for the light-shielding ribbon. However, the scope of the invention is not limited only to this system, and an intermittent type system can serve this purpose.

As described above, the Patrone for photographic film, according to the invention, comprises a film outlet that is composed of upper and lower lips, each having a light-shielding ribbon attached to the inside thereof, wherein both extended side edge portions of ribbon attached to lower lip are slightly bent downward, and, at the same time, both extended side edge portions of ribbons attached to upper lip are bent downward that are slightly larger than those of the lower lip, whereby both side edge portions of both upper and lower lips are more positively joined together thereby pile-to-pile overlap is positively increased.

The Patrone of the invention therefore has various excellent effects: it has perfect light-shielding capability, wherein when it is loaded into a Patrone chamber of a camera, there is no "unsettledness" present below a lower lip, thereby the Patrone is maintained in appropriate position within a camera, and a film stored in the Patrone is readily and smoothly drawing out of the Patrone at a developing laboratory or the like.

Furthermore, a Patrone according to the invention comprises not only a cylindrical shell having a film outlet that is composed of upper and lower lips, each having a light-shielding ribbon attached to the inside thereof; but also caps that independently have on a circumferential face a U-contoured groove that fits to each end of the cylindrical shell, wherein each cap centrally has a through hole through which one end of a spool shaft penetrates; wherein the cylindrical shell holds parts of both side edge portions of the light-shielding ribbons, thereby the light-shielding ribbons are prevented from being stripped while the cap is fitted into position, thus contributing to improved light-shielding capability. At the same time, pile of the light-shielding ribbons attached to the Patrone shell that has been tightened by the cap having been fitted into position does not come into contact with a spool flange, thus eliminating a need for an increased load for drawing out the film.

According to the Patrone of the invention, additionally, the exposure surface of a photographic film is always maintained clean, and is free from contamination with pile chips or floss departed from the light-shielding ribbon, thereby high quality photographs are always available. Other embodiments of the present invention will be apparent to those skilled in the art from consideration of the specification and practice of the disclosed invention. The specification and examples are intended to be exemplary only, with the true scope and spirit of the invention being represented by the following claims.

What is claimed is:

1. A cartridge for packaging a roll of film comprising:
 a shell having inner and outer faces, longitudinal side edges and first and second ends, said shell being substantially cylindrical rolled to form an interior for housing the roll of film;
 said first and second ends of said shell forming upper and lower lips overlapping and spaced a distance from one another to form a slit for the insertion and removal of the film forming the roll of film;
 first and second ribbons having a flat surface and a pile surface to shield said interior of said shell from light, said first and second ribbons being attached to said upper and lower lips, respectively and extending at first and second angles, respectively to said lip and beyond said slit, for first angle of said first ribbon being greater than said second angle of said second ribbon; and
 a plurality of caps having a central face and including a circumferential edge extending therearound said circumferential edge of said caps forming a U-shaped groove for receiving and contacting said inner and outer faces of longitudinal side edges of said shell.

2. The cartridge of claim 1, wherein said second angle of said second ribbon is in the range of 0–10 degrees.

3. The cartridge of claim 2, wherein said second angle is in the range of 4–8 degrees.

4. The apparatus of claim 1, wherein said first angle of said first ribbon is in the range of 15–25 degrees.

5. The apparatus of claim 4, wherein said first angle is in the range of 18–22 degrees.

6. The apparatus of claim 1, wherein the width of said U-shaped groove is in the range of 0.1–1.0 mm and the depth of said U-shaped groove is in the range of 2.2–2.7 mm.

7. The apparatus of claim 1, wherein said ribbons having edges and said ribbon edges being cut after heating treatment.

8. The apparatus of claim 1, wherein the width of said U-shaped groove is in the range of 0.1–1.0 mm and the depth of said U-shaped groove is within the range of 2.2–2.7 mm.

9. The apparatus of claim 1, wherein the height of said pile surface of said ribbons is within the range of 1.2–1.7 mm.

10. The apparatus of claim 1, wherein said ribbons are adhesively secured to said shell and said adhered ribbons having a peel strength of 800–2000 kg.

11. A cartridge for packaging a roll of film comprising:
 a shell having inner and outer faces, two longitudinal side edges and first and second ends, said shell being substantially cylindrical to form an interior for housing the film forming the roll of film;
 said first and second ends of said shell forming upper and lower lips overlapping and spaced a distance from one another to form a slit for the insertion and removal of said film;
 first and second ribbons having a flat surface and a pile surface to shield said interior of said shell from light, said first and second ribbons being attached to said upper and lower lips, respectively and extending at first and second angles, respectively to said lips and beyond said slit; and
 said second angle of said second ribbon being in the range of 0–10 degrees.

* * * * *

UNITED STATES PATENT AND TRADEMARK OFFICE
CERTIFICATE OF CORRECTION

PATENT NO. : 4,928,826
DATED : May 29, 1990
INVENTOR(S) : Osamu Shibazaki et al.

It is certified that error appears in the above-identified patent and that said Letters Patent is hereby corrected as shown below:

Claim 1, col. 7, line 35, "lip" should be --lips--; and "for" should be --said--.

Signed and Sealed this

Seventh Day of April, 1992

*Attest:*

HARRY F. MANBECK, JR.

*Attesting Officer*     *Commissioner of Patents and Trademarks*